Patented Aug. 22, 1950

2,519,462

UNITED STATES PATENT OFFICE 2,519,462

PANTOTHENIC ACID INTERMEDIATES AND PROCESS FOR THEIR PRODUCTION

Stanton A. Harris, Westfield, and Karl Folkers, Plainfield, N. J., assignors to Merck & Co., Inc., Rahway, N. J., a corporation of New Jersey No Drawing. Application July 14, 1945, Serial No. 605,193, which is a division of application Serial No. 386,942, April 14, 1941. Divided and this application March 3, 1948, Serial No. 12,894

5 Claims. (Cl. 260—490)

This invention relates to esters of pantothenic acid, intermediates thereof, and processes for their production. This application is a division of our copending application Serial No. 605,193, filed July 14, 1945, now abandoned, which, in turn, is a division of application Serial No. 386,942, filed April 4, 1941, now abandoned.

Pantothenic acid occurs widely in nature and has recently become available by synthetic methods. According to the most widely used methods of preparation, laevorotatory α-hydroxy-β,β-dimethyl butyrolactone is reacted with β-alanine or some derivative of β-alanine, such as its sodium salt or its ester.

However, pantothenic acid is soluble mainly in polar solvents, such as water and the lower alcohols. For certain types of use it is desired to use pantothenic acid in an oil medium, and for this purpose the ordinary pantothenic acid of commerce is not suited.

We have discovered that esters of pantothenic acid of the following structure $R_1OCH_2C(CH_3)_2CH(OR_2)CONHCH_2CH_2COOR_3$ where $R_1$ is an acyl group or hydrogen, $R_2$ is an acyl group, and $R_3$ is hydrogen or an alkyl group are soluble in oil. Esters of this type may be formed by reacting an ester of α-gamma-dihydroxy-β,β-dimethyl butyric acid chloride with an ester of β-alanine. The butyric acid chloride can be made by reacting α-hydroxy-β,β-dimethyl-gamma-butyrolactone with liquid ammonia to give α-gamma-dihydroxy-β,β-dimethyl butyramide, which is then reacted with a lower aliphatic carboxylic acid anhydride or a lower aliphatic carboxylic acid chloride to give the corresponding ester of the amide. The latter product is reacted with amyl nitrite to produce the corresponding ester of α-gamma-dihydroxy-β,β-dimethyl-butyric acid, which can be represented by the formula:

$CH_2(OOCR)C(CH_3)_2CH(OOCR')COOH$ wherein R and R' are lower alkyl radicals, and from which the desired acid chloride may be obtained by treatment with thionyl chloride.

For certain uses an ester of the following structure is desired:

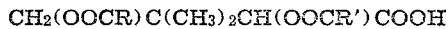

where $R_4$ may be the radical of an organic acid or an inorganic acid, for example, one of the phosphoric acids.

We have discovered that such derivatives may be prepared by reacting the carbobenzyloxy ester of α-hydroxy-β,β-dimethyl butyrolactone with β-alanine or one of its derivatives to form a monocarbobenzyloxy ester of pantothenic acid. The latter may then be treated with the desired esterifying agent, and the resulting diester of pantothenic acid hydrogenated to remove the carbobenzyloxy radical. This process may be illustrated as follows:

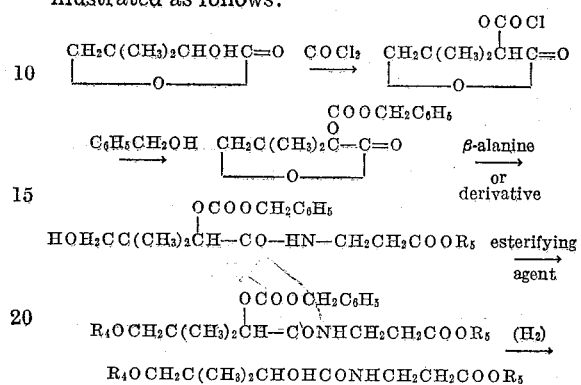

The above diagram also shows how the monocarbobenzyloxy ester of the lactone is prepared.

We have also discovered that mono esters of pantothenic acid or derivatives having the ester residue in the α position of the butyric acid residue may be prepared by treating the lactone with an esterifying agent such as an acid chloride or acid halide to esterify the free hydroxyl group of the lactone, and reacting this lactone containing a single ester group with β-alanine or its derivatives.

The following examples illustrate methods of carrying out the present invention, but it is to be understood that these examples are given by way of illustration and not of limitation.

Example 1

13.6 grams of (—)α-hydroxy-β,β-dimethyl-gamma-butyrolactone and 50 cc. of liquid ammonia are sealed in a bomb tube (using a Dry Ice bath to keep the ammonia liquid until the tube is sealed). The mixture is then allowed to come to room temperature, when the lactone readily dissolves and is dispersed. The solution is allowed to stand overnight at room temperature (25–30°), and then the tube is cooled and opened. The ammonia is allowed to evaporate, whereupon the amide crystallizes spontaneously. The last part of the ammonia is removed under vacuum and the solid residue recrystallized from ethyl acetate. Yield of (+) α-gamma-dihydroxy-β,β-dimethyl butyramide is 15.3 grams (98.5%); M. P. 92–94°, $(α)_D^{29} = +52°$ (2% methanolic solution).

44.1 grams of α,gamma-dihydroxy-β,β-dimethylbutyramide are dissolved in 75 cc. of pyridine, and 71 cc. (25% excess) of acetic anhydride are added. The solution is heated for one-half hour on the steam bath, and then concentrated under reduced pressure. The residue is distilled from a wide side armed flask at 2 mm. pressure and bath temperature of 170° (vapor temperature 155°). The yield of very viscous liquid, α-gamma-diacetoxy-β,β-dimethylbutyramide, is 67.2 g. (97%).

$(\alpha)_D = -0.7°$ (in $CHCl_3$; C=2.848%)
$(\alpha)_D = +6.2°, +6.8°$ (in ether; C=2.432% and 5.292% respectively)
$(\alpha)_D = +6.1$ (in ethyl acetate; C=1.798%)
$(\alpha)_D = -5.4°$ (in dioxane; C=1.486%)
$(\alpha)_D = -4.5°$ (in abs. ethanol; C=1.993%)
$(\alpha)_D = -9.9°$ (in water; C=2.223%)

11.54 grams of α,gamma-diacetoxy-β,β-dimethylbutyramide are dissolved in approximately 50 cc. of glacial acetic acid, and 20 cc. of amyl nitrite are added. The solution is heated on the steam bath for 80 minutes, then concentrated under reduced pressure, and the residue taken up in water in which it dissolves very slowly. The solution is made just alkaline with sodium hydroxide and extracted with chloroform. The aqueous solution is acidified to pH 2 and the α-gamma-diacetoxy-β,β-dimethylbutyric acid extracted with chloroform. The chloroform solution is concentrated to a syrup under 2 mm. pressure. The product weighs 7.52 grams, titrating for 90% acid. It is distilled at $10^{-3}$ mm. at 100° bath temperature. Three fractions are taken, each of which contains nitrogen by qualitative analysis. The third fraction is repurified by dissolving in sodium hydroxide as described above, then redistilled, and α-gamma-diacetoxy-β,β-dimethylbutyric acid is obtained free of nitrogen. $(a)_D^{25°} = -2.6°$ (C=1.512 in methanol); (0 in ether).

4.4 grams of α-gamma-diacetoxy-β,β-dimethylbutyric acid are treated with 2.77 cc. of thionyl chloride, heated on a steam bath for ½ hour, and then the excess of thionyl chloride is removed under vacuum. The residue is dissolved in 5 cc. of pyridine and 2.23 grams of β-alanine ethyl ester are added. Heat is evolved and the solution becomes slightly colored. After standing for 72 hours, the excess pyridine is removed by distillation under vacuum, the syrup dissolved in chloroform, and extracted first with dilute hydrochloric acid, then with sodium bicarbonate solution, and finally dried over calcium chloride. After removal of the chloroform, the syrup is distilled in a sublimation apparatus at $10^{-6}$ mm. pressure, and a bath temperature of 110–120°. Yield of ethyl N-(α-gamma-diacetoxy-β,β-dimethylbutyryl)-β-aminopropionate 3.06 grams (48.5%). $(a)_D^{25°} = +24.2°$ (C=2.08% in ether).

A solution of 0.11 gram of the above ester is dissolved in 10 cc. of 0.5 N-barium hydroxide and allowed to stand at room temperature for one hour. The barium ion is removed quantitatively as the sulfate, and the solution brought to pH 7.5 with sodium hydroxide. Aliquot parts of the solution are assayed microbiologically and found to contain 50% of the theoretical amount of pantothenic acid.

Example 2

0.62 gram of α-p-nitrobenzoxy-β,β-dimethyl-gamma-butyrolactone is heated with 0.233 gram of sodium β-alaninate for one hour on a steam bath. After a few minutes, the mixture becomes gummy, and solidifies to a brittle mass on cooling. The material is dissolved in 10 cc. of water, with deposition of crystals of starting material. The filtrate is acidified with hydrochloric acid, and a gummy precipitate separates. It is readily soluble in alcohol, and is reprecipitated as an oil upon the addition of water. On standing overnight, the mono nitrobenzoate of pantothenic acid crystallizes, and is recrystallized from acetone upon the addition of water, M. P. 137–138°; $(a)_D^{29°} = +4.5°$ (in 95% alcohol, C=0.78%).

Example 3

A benzene solution containing 6 grams of α-hydroxy-β,β-dimethyl-gamma-butyrolactone and 8.65 grams of antipyrine are added to a benzene solution containing 4.6 grams phosgene. Crystalline antipyrine hydrochloride separates. After 15 minutes, 5 grams benzyl alcohol and 8.65 grams antipyrine dissolved together in benzene are added to the above solution whereupon heat is evolved, and additional antipyrine hydrochloride separates out. The mixture is heated on a steam bath for 15 minutes, then filtered, the filtrate washed three times with water, and then dried over calcium chloride. After concentration under reduced pressure, the syrup commences to crystallize. It is recrystallized by dissolving in water, and adding a little alcohol until tubidity is produced. On cooling α-carbobenzyldioxy-β,β-dimethyl-gamma-butyrolactone separates, M. P. 78°; yield 5.05 grams (41.8%), $(a)_D^{29°} = +12.3°$ (in 95% alcohol, C=2.1%).

1.9 grams of freshly distilled β-alanine ethyl ester are mixed with 4.2 grams of α-carbobenzyldioxy β,β-dimethyl butyrolactone, and heated on a steam bath for 1½ hours. It is then shaken with water and extracted with ether. After washing with dilute hydrochloric acid and water, the ether extract is dried over calcium chloride, and filtered with charcoal. The oily residue is distilled between 140–150° bath temperature at $4 \times 10^{-6}$ mm. pressure.

Example 4

26 grams of acetyl lactone are mixed with 17.7 grams of β-alanine ethyl ester, and heated on the steam bath for two hours. It is then distilled from a wide armed distilling flask at $10^{-2}$ mm. A forerun up to 155° totaling 12 grams is obtained. The main crop distilled at 155–160°. The yield of monoacetyl ethyl pantothenate is 28 grams (64.5%).

We wish it to be understood that we do not desire to be limited to the exact details described, for obvious modifications will occur to a person skilled in the art.

We claim:

1. The process of preparing α,γ-diacyloxy-β,β-dimethyl-butyric acid which comprises reacting α,γ-dihydroxy-β,β-dimethyl-butyramide with a compound selected from the class which consists of lower aliphatic carboxylic acid anhydrides and lower aliphatic carboxylic acid chlorides, and reacting the compound thus obtained with amyl nitrite.

2. The process of preparing α,γ-diacetoxy-β,β-dimethyl-butyric acid which comprises reacting α,γ-dihydroxy-β,β-dimethyl-butyramide with acetic anhydride in the presence of pyridine and reacting the compound thus obtained with amyl nitrite, said reaction being carried out in solution in glacial acetic acid.

3. The process of preparing α,γ-diacetoxy-β,β- dimethyl-butyramide which comprises reacting α,γ-diacetoxy-β,β-dimethyl-butyramide with acetic anhydride in the presence of pyridine.

4. The process of preparing α,γ-diacetoxy-β,β-dimethyl-butyric acid which comprises reacting α,γ-diacetoxy-β,β-dimethyl-butyramide with amyl nitrite, said reaction being carried out in solution in glacial acetic acid.

5. α,γ-diacetoxy-β,β-dimethyl-butyramide.

STANTON A. HARRIS.
KARL FOLKERS.

REFERENCES CITED

The following references are of record in the file of this patent:

UNITED STATES PATENTS

| Number | Name | Date |
|---|---|---|
| 2,372,041 | Woolley | Mar. 20, 1945 |

OTHER REFERENCES

Harris: Jour. Am. Chem. Soc. 63, pages 2662-2667 (1941).

Certificate of Correction

Patent No. 2,519,462                                                 August 22, 1950

STANTON A. HARRIS ET AL.

It is hereby certified that error appears in the printed specification of the above numbered patent requiring correction as follows:

Column 5, line 2, for "diacetoxy" read *dihydroxy*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*